United States Patent
Adams et al.

(10) Patent No.: US 6,334,145 B1
(45) Date of Patent: Dec. 25, 2001

(54) METHOD OF STORING AND CLASSIFYING SELECTABLE WEB PAGE LINKS AND SUBLINKS THEREOF TO A PREDETERMINED DEPTH IN RESPONSE TO A SINGLE USER INPUT

(75) Inventors: David Michael Adams, Round Rock; John Maddalozzo, Jr., Austin; Gerald Francis McBrearty, Austin; Johnny Meng Han Shieh, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/106,957

(22) Filed: Jun. 30, 1998

(51) Int. Cl.[7] ............................ G06F 15/16; G06F 15/177
(52) U.S. Cl. ...................... 709/217; 709/245; 709/219; 709/203; 345/650; 345/738; 345/760
(58) Field of Search ...................... 345/329, 738, 345/331, 332, 346, 354, 760, 327, 650; 707/522, 500, 10, 4; 709/229, 203, 217, 218, 219, 250, 245

(56) References Cited

U.S. PATENT DOCUMENTS 5,761,436 * 6/1998 Nielsen ........................... 709/245
5,813,007 * 9/1998 Nielsen ........................... 707/10
5,848,410 * 12/1998 Walls et al. ...................... 707/4
5,855,020 * 12/1998 Kirsch ............................. 707/10
5,917,491 * 6/1999 Bauersfeld ...................... 345/352
5,982,370 * 11/1999 Kamper .......................... 345/356
6,023,701 * 2/2000 Malik et al. .................... 707/10

OTHER PUBLICATIONS

Using Netscape ™ 2: Brown, Mark, 2nd Ed. Que ®, 1995; (see bookmarks, 32, creating, 213–214, header folders, 223–224, nesting, 224, hierarchical lists, 220–225).*

* cited by examiner

Primary Examiner—Le Hien Luu
Assistant Examiner—Beatriz Prieto
(74) Attorney, Agent, or Firm—Volel Emile; Bracewell & Patterson, L.L.P.

(57) ABSTRACT

An improved method for efficiently retrieving data associated with linked network locations utilizing a computer network is disclosed. First, data is retrieved from a network location which has a plurality of links to related network locations. Next, in response to a single user input, the plurality of links and their network addresses are automatically classified into a folder having common subject matter. A user can later efficiently retrieve data associated with the classified network locations utilizing the common category of network addresses.

9 Claims, 9 Drawing Sheets

METHOD OF STORING AND CLASSIFYING SELECTABLE WEB PAGE LINKS AND SUBLINKS THEREOF TO A PREDETERMINED DEPTH IN RESPONSE TO A SINGLE USER INPUT

BACKGROUND OF THE INVENTION

1. Technical Field

The present invention relates in general to an improved method for efficient information retrieval in a data processing system, and in particular to an improved method for organizing related network address locations in a data processing systems. Still more particularly, the present invention relates to efficiently classifying linked network addresses which are displayed on a web page by placing the network addresses of the linked web pages into a folder in response to a single user input.

2. Description of the Related Art

The development of computerized information resources, such as interconnection of remote computer networks, allows users of data-processing systems to link with other "servers" and networks, and thus retrieve vast amounts of electronic information heretofore unavailable in an electronic medium. A server provides interconnection among communicating networks. Such electronic information is increasingly displacing more conventional means of information transmission, such as newspapers, magazines, and even television. Often, users desire quick access to specific information on a reoccurring basis. It is therefore desirable to maximize efficiency and minimize complexity when researching and storing multiple web sites which are linked.

In computer communications, a set of computer networks which are possibly dissimilar from one another are joined together by "gateways". Gateways provide data transfer and conversion of messages from the sending network to the protocols and data type utilized by the receiving network. A gateway is a device utilized to connect dissimilar networks, or networks utilizing different communication protocols, such that electronic information utilizing different standards can be processed and transmitted from network to network. Gateways convert information to a form compatible with the protocols utilized by other networks for transport and delivery.

One type of remote network commonly utilized in recent years is the Internet. The term "Internet" is an abbreviation for "Internetwork," and is commonly utilized to describe the collection of networks and gateways which are compatible with the TCP/IP suite of protocols. TCP/IP protocols are well-known in the art of computer networking. TCP/IP is an acronym for "Transmission Control Protocol/Internet Protocol," a software protocol developed by the Department of Defense for communication between computers. The Internet can be described as a system of geographically distributed remote computer networks interconnected by computers which provide an interface that allow users to interact and share information over the networks. Because of such wide-spread information sharing, remote networks such as the Internet have thus far generally evolved into an "extensive" system which developers can provide information or services essentially without restriction.

Electronic information transferred between data-processing networks is usually presented in "hypertext", a metaphor for presenting information in a manner in which text, images, sounds, and actions become linked together in a complex non-sequential "web" of associations. The web of associates permit a user to "browse" or "navigate" through related topics, regardless of the presented order of the topics. These links are often established by both the author of a hypertext document and by the user, depending on the intent of the hypertext document. For example, traveling among links to the word "iron" in an article displayed within a Ingraphical user interface, in a data-processing system, might lead the user to the periodic table of the chemical elements (i.e., linked by the word "iron"), or to a reference to the utilization of iron in weapons in Europe in the Dark Ages.

The term "hypertext" was coined in the 1960s to describe documents, as presented by a computer, that express the nonlinear structure of ideas, as opposed to the linear format of books, film, and speech. The term "hypermedia," on the other hand, more recently introduced, is nearly synonymous with "hypertext," but focuses on the non-textual components of hypertext, such as animation, recorded sound, and video.

A typical networked system which utilizes hypertext and hypermedia conventions follows a client/server architecture. The "client" is a member of a class or group that utilizes the services of another class or group to which it is not related. Thus, in computing, a client is a process (i.e., roughly a program or task) that requests a service provided by another program active in a "server". The client process utilizes the requested service without having to "know" any working details about the other program or the service itself. In a client/server architecture, particularly a networked system, a client is usually a computer that accesses shared network resources provided by a server (i.e., another computer).

A request for information by a user is sent by a client application program to a server. A server is typically a remote computer system accessible over a remote network, such as the Internet. The server scans and searches for raw (e.g., unprocessed) information sources, for example, newswire feeds or newsgroups. Based upon the user's request, the server presents filtered electronic information as a server response to the client process. The client process may be active in a first computer system, and the server process may be active in a second computer system. The client and server communicate with one another over a communications medium, thus providing distributed functionality and allowing multiple clients to take advantage of the information-gathering capabilities of a single server.

Free or relatively inexpensive computer software applications, such as Internet "search engines," allow a user to locate sites where an individual can obtain information on a topic of interest. A person utilizing a graphical user interface of a computer system may enter a subject or key word which generates a list of network sites or "web sites". "Home pages" or title pages for a web site are published by thousands of companies, universities, government agencies, museums, and municipalities. Thus, the Internet can be an invaluable information resource.

A client and server can communicate with one another utilizing the functionality provided by Hypertext-Transfer Protocol (HTTP). The World Wide Web (WWW) or, simply, the "web," includes those servers adhering to the HTTP standard, such servers are accessible to clients via a computer or data-processing system network address, such as a Universal Resource Locator (URL). A network location can be directly accessed by utilizing a Universal Resource Locator address.

Active within the client is a first process, known as a "browser," which establishes the connection between the client and the server and presents information to the user on a graphical user interface. The server itself executes corresponding server software which presents information to the client in the form of HTTP responses. The HTTP responses correspond to "web pages" constructed from a Hypertext Markup Language (HTML), or other server-generated data. A client and a server may be coupled to one another via a Serial Line Internet Protocol (SLIP) or a TCP/IP connection for high-capacity communication.

Generally a client displays a browser and data received from the network is displayed via a graphical user interface. A graphical user interface is a type of display format that enables a user to choose commands, start programs, and see lists of files and other options by pointing to pictorial representations (icons or selectable buttons) and/or lists of menu items on the display. User selections are generally activated either with a keyboard or a mouse.

A graphical user interface (GUI) can be employed by a user to start processes, view file content and to select tools. Additionally, a GUI allows a user to command many selectable tools by pointing to a desired selection and depressing a push button typically utilizing a mouse. A desired selection might be a textual reference, a toolbar button, or a selection from a list of menu items on a computer display screen.

A user selectable choice can generally be activated by either a keyboard or a push button switch located on a pointing device such as a "mouse". A mouse is a commonly utilized pointing device, generally containing more than one button. A pointing device allows a user to interact with a product or operating environment, such as a graphical user interface. In many graphical user interfaces, a vertical or horizontal bar at the side, bottom or top of a graphical user interface window can be utilized in conjunction with a pointing device, such as a mouse, trackball, or stylus to quickly select features of the application program.

Additional vertical and horizontal bars may contain "selectable buttons." Selectable buttons are commonly called "icons" by those familiar with graphical user interfaces. An icon is a selectable button viewable within a graphical user interface, typically containing a pictorial representation or a mnemonic representative of a selectable feature.

Generally, the pictorial representation contained within an icon is a graphic symbol allowing a user to associate an icon with a particular selectable function. An icon can be selected by pointing to the icon utilizing a pointing device and activating a push-button on the mouse when the icon is pointed to. Pointing to a selection and depressing a mouse button is commonly referred to by those having skill in the art as "pointing and clicking" on the icon or on the menu item. Pointing and clicking is a user friendly way to select a particular function or software application. Generally, an icon contains a visual mnemonic which allows a user to identify a selection without having to remember commands or type in commands utilizing a keyboard as is required in a disk operating system (DOS) environment.

Horizontal or vertical bars containing textual menu category headings are commonly referred to as menu bars. Horizontal or vertical bars containing icons are commonly referred to as toolbars. Toolbars are a well known part of graphical user interfaces which simplifies access to files and allows the user to perform complicated system commands by pointing and clicking on a selectable item within the graphical user interface. Toolbar selectable user commands provide efficient interface between the user and a computer system. Often, user selectable commands located on a toolbar are duplicated in the menu bar.

It is easier and more efficient to activate selections within a toolbar than to locate and select menu headings and corresponding menu items. Menu items and sub-menu items are not continuously displayed and a menu heading must be selected to view a list of menu items contained under the menu heading.

It is often difficult for a user to locate desirable information resources, or "web pages," in a computer network and locating a pertinent resource can consume a substantial amount of time. A web page is typically defined as electronic data in html format which resides in a particular directory in a data processing system and can be accessed by a client. Locating an information resource-is typically done by keyword searching. Keyword searching is accomplished when a user provides a keyword and instructs the client via a server to search for information resources having the keyword or information resources linked to the keyword. Typically, the user receives voluminous information from the internet when a keyword search is performed. A single retrieval can provide links to a considerable quantity of web sites. Next, the user must sort through the received information for desirable data.

Web pages or network locations can also be accessed by a client which specifies a unique network address (i.e., Universal Resource Locator). A Universal Resource Locator has two basic components, the protocol to be utilized and the object pathname. For example, the Universal Resource Locator address, "http://www.uspto.gov" is the home page for the U.S. Patent and Trademark Office. This address specifies a hypertext-transfer protocol ("http") and a pathname of the server ("www.uspto.gov"). The server name is associated with a unique numeric value (TCP/IP address).

In order to avoid the inefficiencies of relocating a resource after it is has been initially located, a "bookmark," "favorites" or "hotlist" function is typically offered as part of the graphical user interface within a web browser application program. Generally, a bookmark is a universal resource locator address "URL" which is stored by the browser. URL can be organized into folders as desired by a user. When a bookmark is selected, the corresponding URL address is sent to a server by a client, then the desired location is accessed and corresponding information is retrieved efficiently with minimal user input and effort.

A typical user stores a considerable quantity of bookmark locations. However, limited space is available on the computer display to display bookmarks. Typically, a user will organize bookmark locations into folders, which reside in menus and sub-menus. Locating bookmarks in folders menus and/or sub-menus complicates bookmark access.

Often, a particular network location or web page of interest has "links" displayed. Links or linked keywords provide a quick and efficient access to other web pages which have information related to the highlighted keyword. Typically, the link displayed provides a URL address which resides in hidden text within the displayed web page. When a user points and clicks on a displayed link, a browser will retrieve the hidden URL address and the directly access the web page associated with the displayed link utilizing the URL found in the hidden text.

Typically, links within a web page provide quick access to identical or related subject matter. Selecting and retrieving a linked web page allows fast and efficient examination of the linked subject matter for relevance. Browsing through many web pages and bookmarking web pages of interest is a highly desirable feature. However, when a session of browsing for electronic data files by a user is complete, the web pages accessed and bookmarked, reside in random order or unorganized fashion in the pull down bookmark menu.

Trying to revisit related bookmarks which were created through visiting linked web sites is very difficult. Often, bookmark features will place network addresses in a folder in alphabetical order. Therefore, to maintain coherency after an information gathering secession is finished, the user must manually create a folder within the pulldown bookmark menu and then search the bookmark list and utilize human memory to determine the relationship between bookmarked web sites. Then a user must manually select, drag and drop bookmarked addressed web pages into a common folder. If each network location must be re-accessed to determine subject matter, further inefficiencies result.

It would be preferred to allowed a user to efficiently organize and store linked web sites utilizing minimum effort. Proficient management of related web sites for information gathering would be very advantageous.

For example, an investor in the stock market might visit an investors advisory location, a location linked to the advisory location having information on how foreign markets closed and another linked location having comments made by the Federal Reserve Chairman. It would be desirable to efficiently place the network locations into a folder with a common title with minimal user input. The user might want to visit these web pages on a daily basis. An automated system for quickly and directly storing these pages for quick access would be highly desirable.

Currently accessing, and cataloging related bookmark or hotlist locations is an inefficient process. Management of topically related network locations currently must be performed manually by a user.

In known browers adding network locations to a bookmark requires the user to display a web page then click on the menu item entitled bookmark or hotlist to display pull down menus containing folders or URLs, then click on an add to bookmark selection.

To organize bookmarks the user must manually create a folder then select a bookmark location and manually move bookmarks into a folder. The user must traverse the pull down menu with the mouse button depressed and select a menu item in the pull down menu, such as a folder. Next, the folder must be selected and opened, and finally a URL address or bookmark must be selected. Minimal user input would be desirable to efficiently catalog or organize web pages bookmarked under similar subject matter. A user friendly interface for associated bookmarks would provide a user friendly interface.

Currently, organizing bookmarks or hotlist items within a browser program requires opening files and performing multiple steps, such as selecting through a series of menu or sub-menu items to move a bookmark to another folder which contains related subject matter. With known graphical user interfaces, each time a folder which is listed under a menu heading in a sub-menu requires selection, user precision is required to highlight the menu heading, traverse the newly displayed sub-menu items while keeping the mouse button depressed, and then releasing the mouse button or double clicking the mouse button on the desired selection.

To organize random URLs in a pulldown menu, a computer operator is required to perform abrupt changes in the motion of the mouse in coordination with a mouse button to select a concealed menu item that resides within a folder. During menu item selection, a user cannot be clumsy or inattentive, because a menu item selection might be made which was not desired.

A sub-menu item is typically less than quarter of an inch in height on a typical display or monitor. Therefore, substantial dexterity is required to traverse menus and select desired menu items utilizing a pointing device, further coordinated with mouse button activation to move bookmarks to common folders. Erroneous menu selections results when a user over-shoots his intended menu item selection by only a fraction of an inch. It would be beneficial to automate the organization process.

Based on the foregoing, it can be seen that a need exists for fast and efficient creation of classified bookmarks resulting from a user session accessing linked web sites. It would therefore be desirable to devise a method of minimal complexity which allows users to efficiently command a computer to catalog linked web sites. It would be further advantageous to devise a method to allow a user to manage a list of linked networks locations such that the user can re-access the cataloged web sites efficiently. Additionally, it would be advantageous if the method would retain current toolbar behavior, but extend user functionality and decrease visual complexity.

SUMMARY OF THE INVENTION

It is therefore one object of the present invention to provide an improved method for efficient information retrieval in a data processing system.

It is another object of the present invention to provide an improved method for organizing related network address locations in a data processing system.

It is yet another object of the present invention to provide a method and system for efficiently classifying linked network addresses which are displayed on a web page by placing the network addresses of the linked web pages into a folder in response to a single user input.

The foregoing objects are achieved as is now described. An improved method for efficiently retrieving data associated with linked network locations utilizing a computer network is provided. First, data is retrieved from a network location which has a plurality of links to related network locations. Next, in response to a single user input, the plurality of links and their network addresses are automatically classified into a folder having common subject matter. A user can later efficiently retrieve data associated with the classified network locations utilizing the common category of network addresses.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
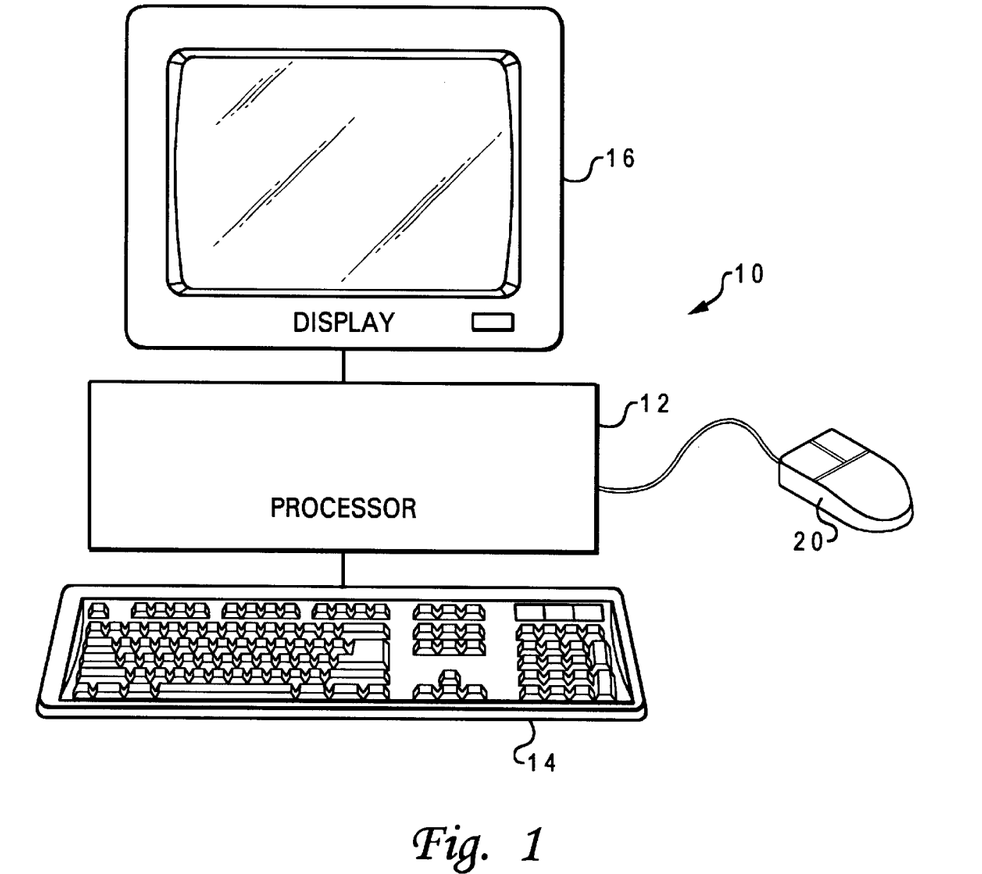
FIG. 1 is a pictorial representation of a data processing system which can be utilized to implement the method and system of the present invention.

With reference now to the figures and in particular with reference to FIG. 1, there is depicted a pictorial representation of a data-processing system in which a preferred embodiment of the present invention may be implemented. A computer 10 is depicted which includes a system unit 12, video display terminal 16, alphanumeric input device (i.e., keyboard 14) having alphanumeric and other keys, and mouse 20. An additional input device (not shown), such as a trackball or stylus, (not shown) also can be included with computer 10.

Computer 10 can be implemented utilizing any suitable computer, such as an IBM Aptiva™ computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data processing systems, such as intelligent workstations or mini-computers. Computer 10 also preferably includes a graphical user interface that resides within a machine-readable media to direct the operation and user interface of computer 10. Computer 10 also can be implemented utilizing any suitable computer, such as the IBM RISC/6000 computer, also a product of International Business Machines corporation, located in Armonk, N.Y. "RISC SYSTEM/6000" is a trademark of International Business Machines Corporation, and also can be referred to as the "IRS/6000."

Figure 2:
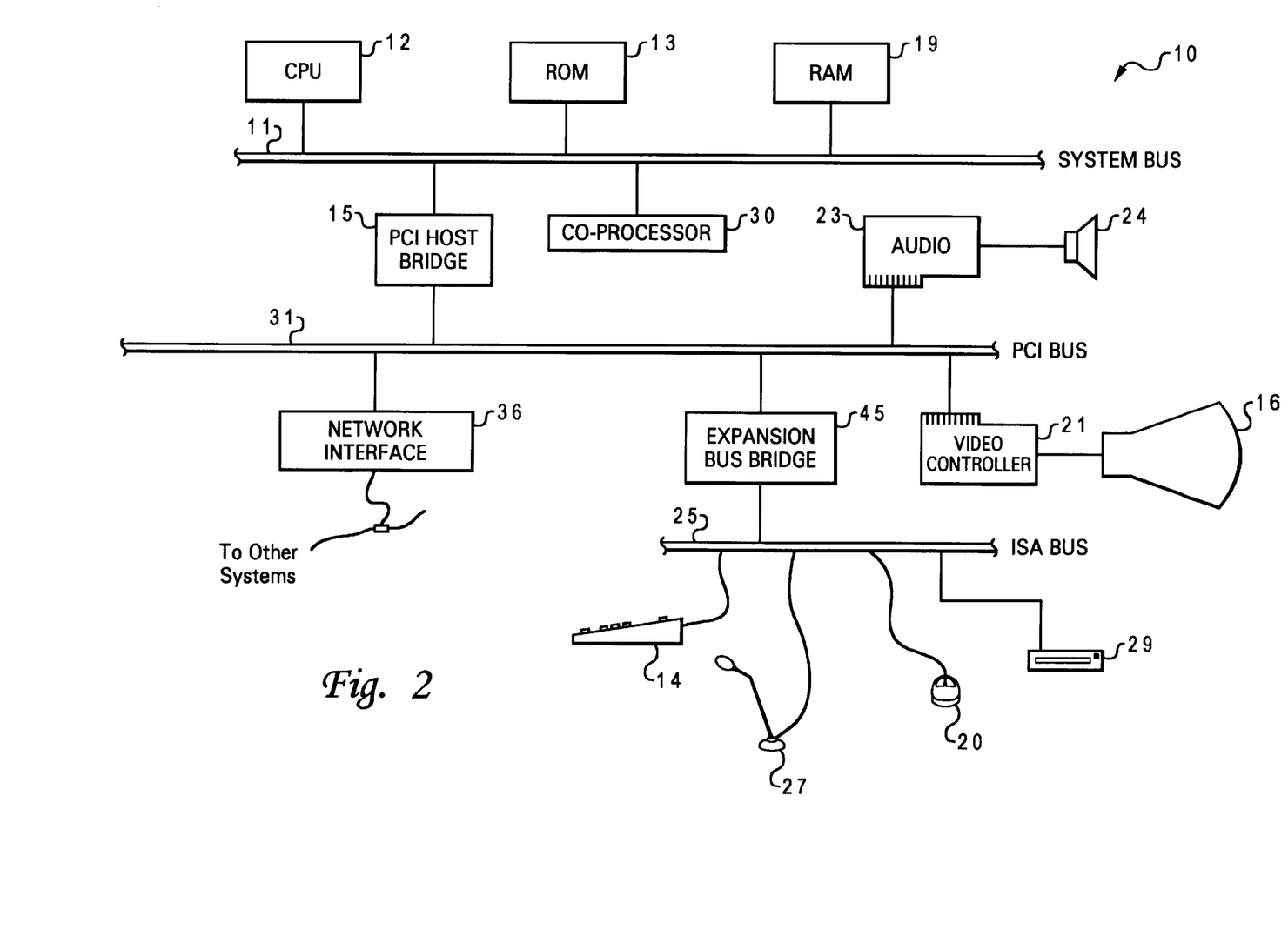
FIG. 2 depicts a block diagram illustrative of selected components of a data processing system or personal computer system in accordance with the method and system of the present invention.

Referring now to FIG. 2, there is depicted a block diagram of selected components in accordance with computer 10 of FIG. 1. A preferred embodiment of the present invention may be implemented with the system architectures of FIG. 2. Computer 10 preferably includes a system bus 11. System bus 11 is utilized for interconnecting and establishing communication between various components within computer 10. Microprocessor or central processing unit (CPU) 12 is connected to system bus 11 and also may have numeric co-processor 30 connected to it. Read-only memory ("ROM") 13 and random-access memory ("RAM") 19 are also connected to system bus 11. ROM 13 is mapped into CPU 12 address space in the range from 640 K to 1 megabyte. RAM 19 is attached to system bus 11 and contains system-configuration information. Any suitable machine-readable media may retain an application program, such as a graphical user interface, a browser within computer 10, such as RAM 19, ROM 13, a magnetic diskette, magnetic tape, or optical disk.

Also connected to system bus 11 is PCI host bridge 15 which couples system bus 11 to PCI bus 31. PCI host bridge 15 controls the flow of data between PCI bus 31 and various peripherals, adapters, and devices. Expansion bridge bus 45 controls the flow of data from PCI bus 31 to ISA bus 25. ISA bus 25 couples various I/O devices to computer 10. I/O devices include keyboard 14, mouse 20, disk drive 29 and microphone 27. Keyboard 14, mouse 20 and disk drive 29 typically have controllers (not shown) which are utilized to interface ISA bus 25. Video controller 21 provides a hardware interface for video display terminal 16. Audio controller 23 provides a hardware interface for speaker 24.

A network interface adapter 36 additionally can be connected to PCI bus 31 in order to link computer 10 to other data-processing system networks in a client/server architecture or to groups of computers and associated devices which are connected by communications facilities (not shown).

Figure 3:
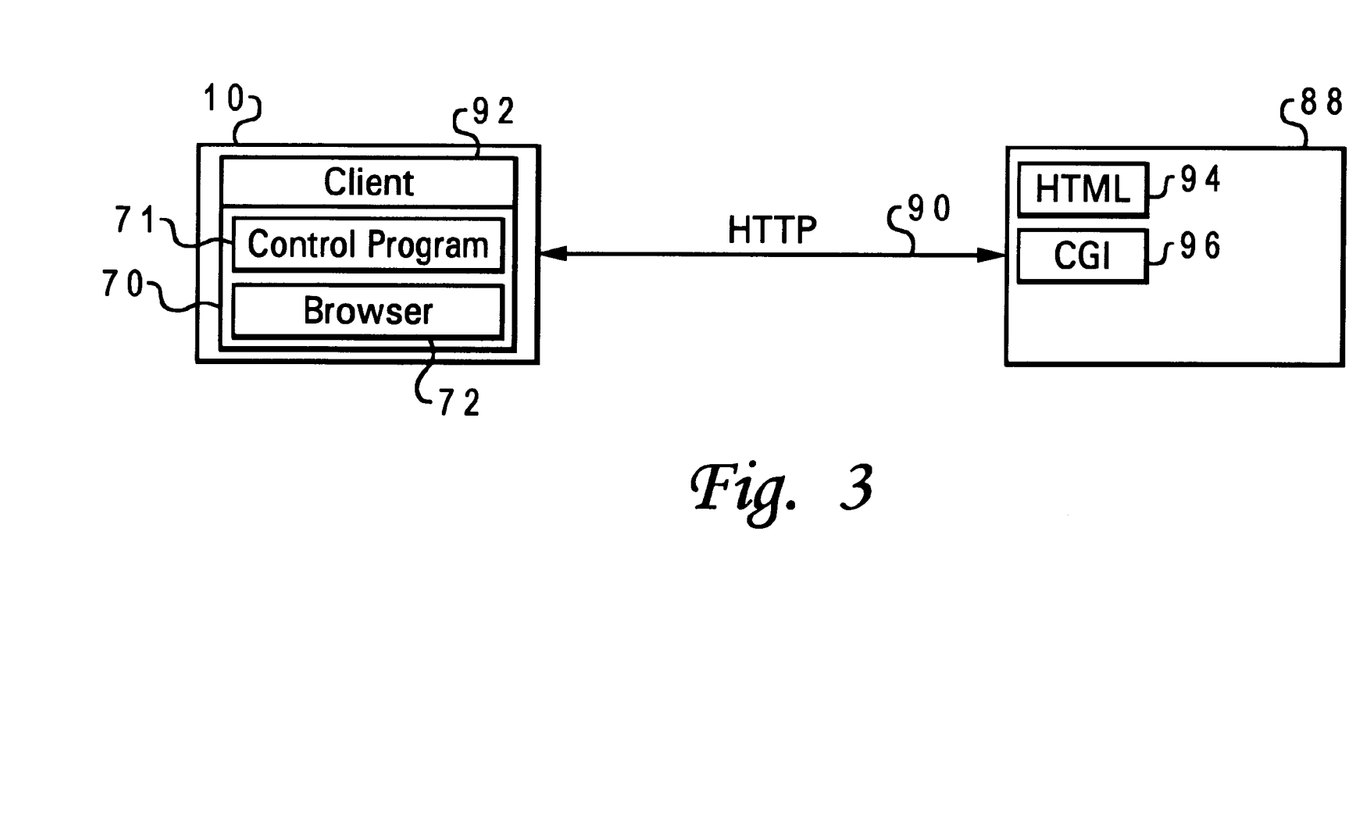
FIG. 3 is illustrative of a client server relationship which can be implemented in accordance with the method and system of the present invention.

FIG. 3 illustrates a block diagram illustrative of a client/server architecture which can be utilized in accordance with the method and system of the present invention. In FIG. 3, user requests for information are sent by client 92 via computer 10 in cooperation with an application program, such as browser 72 to server 88. Server 88 can be a remote computer system accessible over a communication line 90 or a remote network, such as the Internet. Server 88 performs scanning and searching of raw or unprocessed information sources, such as newswire feeds or newsgroups, and based upon these user requests, the server presents filtered electronic information as a server response over communication line 90 to the client process.

The client process may be active in a first computer system, and the server process may be active in a second computer system. The server process communicates with the first computer system over a communications medium, thus providing distributed functionality and allowing multiple clients to take advantage of the information gathering capabilities of a single server located miles away.

In a preferred embodiment, computer 10 and server 88 communicate utilizing the functionality provided by HTTP. Active within computer 10 is a first process, browser 72, which establishes the connections with server 88, and presents information to the user via a graphical user interface. Such browsers are often referred to in the art of computer networking as "web browsers." Any number of commercially or publicly available browsers may be utilized in accordance with a preferred embodiment of the present invention. For example, the Mosaic-brand browser available from the National Center for Supercomputing Applications (NCSA) in Urbana-Champaign, Ill., can be utilized with a preferred embodiment of the present invention. Other browsers, such as Netscape™, Netcruiser, Explorer or the Lynx-brand browsers which provide the functionality specified under HTTP can also be utilized with a preferred embodiment of the present invention.

Server 88 executes the corresponding server software which presents information to client software in the form of HTTP responses. HTTP responses correspond with "web pages," which can be represented by utilizing Hypertext Markup Language (HTML), or other data generated by server 88. For example, under the Mosaic-brand browser, in addition to HTML functionality 94 provided by server 88, a Common Gateway Interlace (CGI) 96 is provided which allows the client program to direct server 88 to commence execution of a specified program contained within server 88. A client program may include a search engine which scans received information in server 88 for presentation to the user via client 92.

Utilizing a browser interface, and HTTP responses, server 88 may notify client 92 of the results of an execution upon completion. Common Gateway Interlace (CGI) 96 is one form of a "gateway," a device utilized to adapt data for utilization by dissimilar networks (i.e., networks utilizing different communication protocols), such that electronic information in different forms can be passed from one network to another. Gateways transfer electronic information, converting such information to a form compatible with the protocols utilized by a second network for transport and delivery.

Software application programs residing in main memory 70 are accessible by CPU 12 via system bus 11 of computer 10 described in FIG. 2. Applications in main memory include control program 71. Control program 71 contains instructions that when executed on a CPU carries out computations as a computer program product. The computer program product can also be referred to as a program product. Control program 71 can support a number of Internet-access tools including, for example, an HTTP-compliant web "browser." Known browser software applications include: Netscape Navigator® ("Netscape"), Mosaic, Microsoft Explorer, and the like. Netscape, in particular, provides the functionality specified under HTTP. "Netscape" is a trademark of Netscape, Inc. Mosaic-brand browser is available from the National Center for Supercomputing Applications (NCSA) in Urbana-Champaign, Ill., and Explorer is available from Microsoft Corp. However, the present invention can operate with any web browser or any developing web browser Control program 71 can support other remote network services, such as a file-transfer protocol (FTP) service, which facilitates the transfer and sharing of files across remote networks, such as the Internet. Control program 71 can further support remote network services, such as remote terminal access (Telnet), which allows users to log onto computers coupled to the network. In addition, control program 71 can support services, such as simple mail-transfer protocol (SMTP), or e-mail, and network news-transfer protocol (NNTP) or "Usenet," all of these network services are well-known in the art of computer networking.

It is important to note that, while the present invention has been, and will continue to be described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include recordable-type media, such as floppy disks, hard-disk drives, audio CDs and CD ROMs, and transmission-type media, such as digital and analog communication links.

Those skilled in the art will appreciate that the hardware depicted in FIGS. 1 and 2 may vary for specific applications. For example, other peripheral devices, such as optical-disk media, audio adapters, or chip-programming devices, such as PAL or EPROM programming devices and the like also may be utilized in addition to or in place of the hardware already depicted. Note that any or all of the above components and associated hardware may be utilized in various embodiments. However, it can be appreciated by those having skill in the art that any configuration of the aforementioned system and any future yet to be developed configuration may be utilized to implement the present invention.

Figure 4:
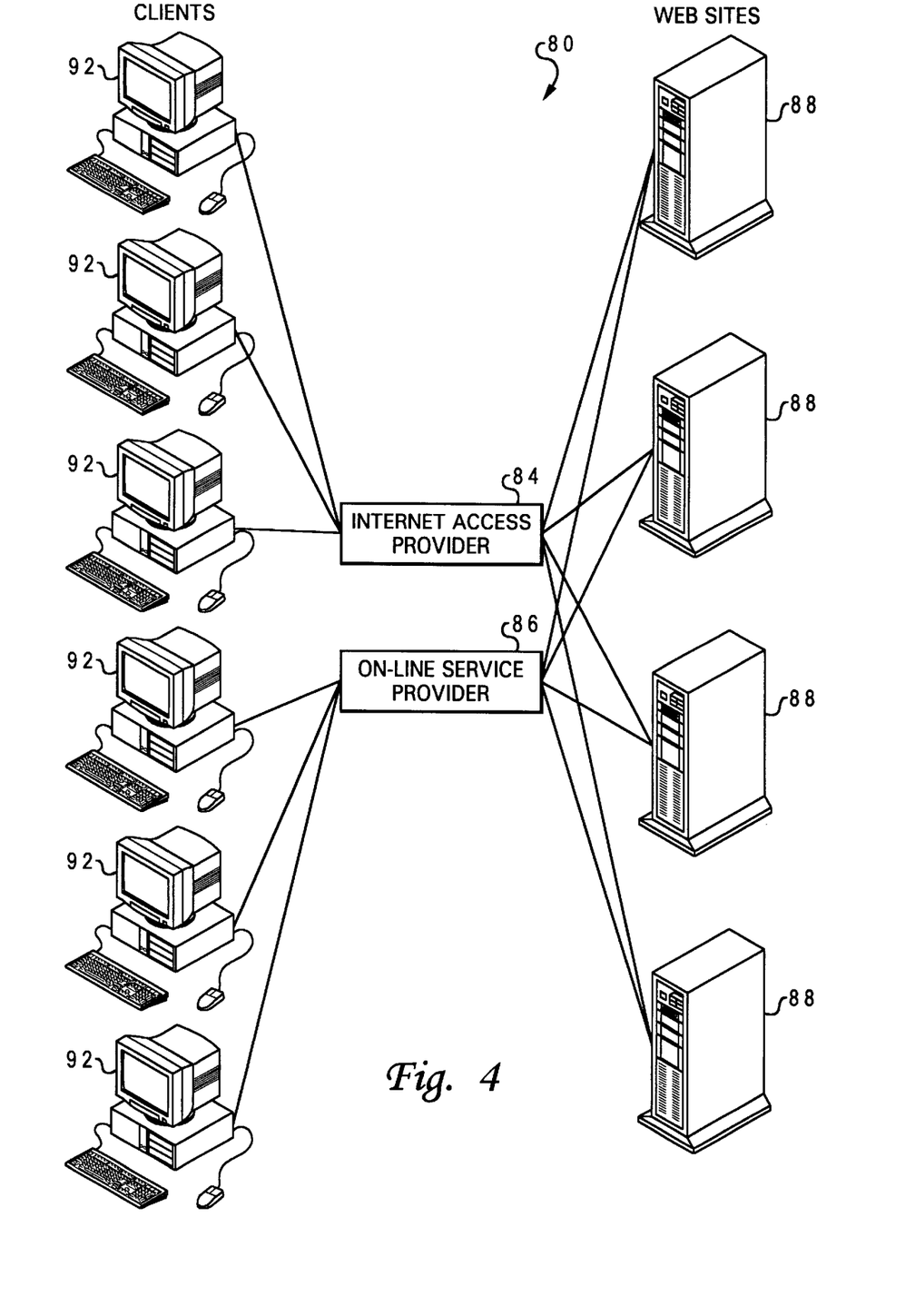
FIG. 4 depicts an internet configuration in which an implementation of a method and system can be accomplished in accordance with the present invention.

Referring to FIG. 4 an illustration of a computer network 80 is depicted which can be implemented in accordance with the method and system of the present invention. In FIGS. 3 and 4 like parts are identified utilizing like reference numerals. Computer network 80 is representative of a remote network, specifically the Internet, a known computer network based on the client-server model discussed earlier. Conceptually, the Internet includes a large network of servers 88 which are accessible by clients 92, typically users of personal computers. Personal computers typically access a server via a private Internet access provider 84 (e.g., such as Internet America) or an on-line service provider 86 (e.g., such as America On-Line, Prodigy, Compuserve, and the like). Each client 92 may run a browser, a known software tool utilized to access server 88 via Internet access provider 84. Server 88 operates a web site which supports files in the form of documents and pages. A network path to server 88 is identified by a Universal Resource Locator (URL) having a known syntax for defining a network collection. Again, FIGS. 3 and 4 are merely illustrative and it can be appreciated by those having skill in the art that any working configuration or future configuration can be utilized to implement the present invention. New communication configuration will not part from the scope of the present invention.

Figure 5:
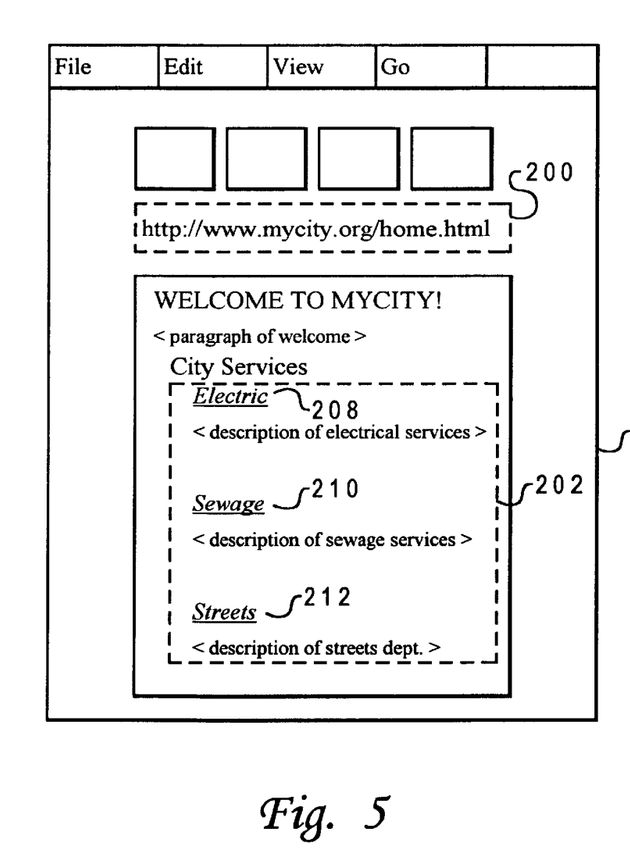
FIG. 5 illustrates a typical web page having links in accordance with the present invention.

Referring now to FIG. 5, an exemplary web page or "initial web page" 204 is depicted. Initial web page 204 has been retrieved over a computer network and displayed according to a user's request. An initial web page is typically defined as electronic data in html format which resides in a particular directory in a data processing system and can be accessed by a client over electronic communication lines. A typical initial web page 204 displays its html address as depicted in first dashed enclosure 200. In second dashed enclosure 202, text describing selectable features available from initial web page 204 are illustrated. Links illustrated in second dashed enclosure 202 are typically italicized or highlighted to inform the user that additional network locations can be addressed by pointing and clicking on the highlighted link. Electric link 208, sewer link 210 and streets link 212 are illustrated within second dashed enclosure 202. These links can provide additional web pages providing more detail about specific features having subject matter related to initial web page 204.

Figure 6:
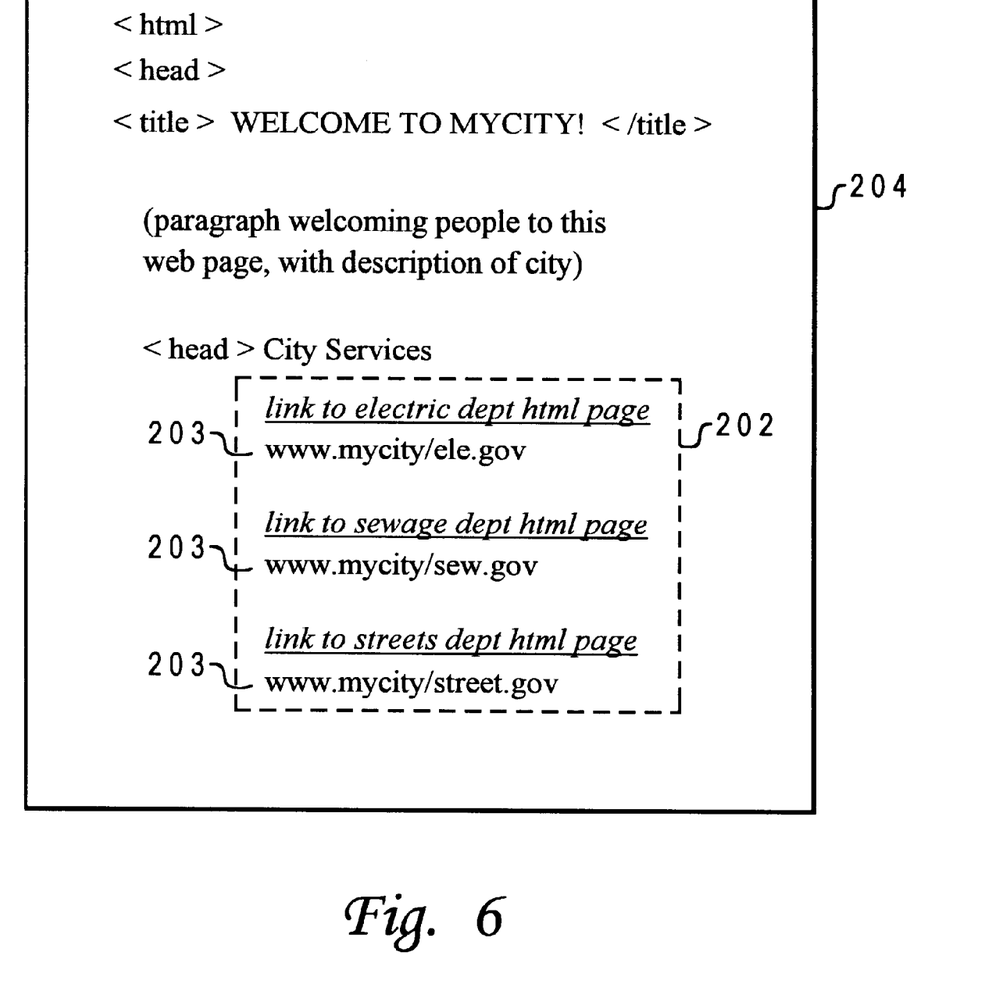
FIG. 6 depicts a web page displaying the html source for a home page in accordance with the present invention.

Referring to FIG. 6 the html source for initial web page 204 of FIG. 5 is depicted. In FIGS. 5 and 6 like parts are identified by like reference numerals. Initial web page 204 contains hidden text containing network addresses which define links provided in second dashed enclosure 202. A URL or network address is typically provided for the links in second dashed enclosure 202. Network addresses 203 provide links to web pages having related subject matter.

Figure 7:
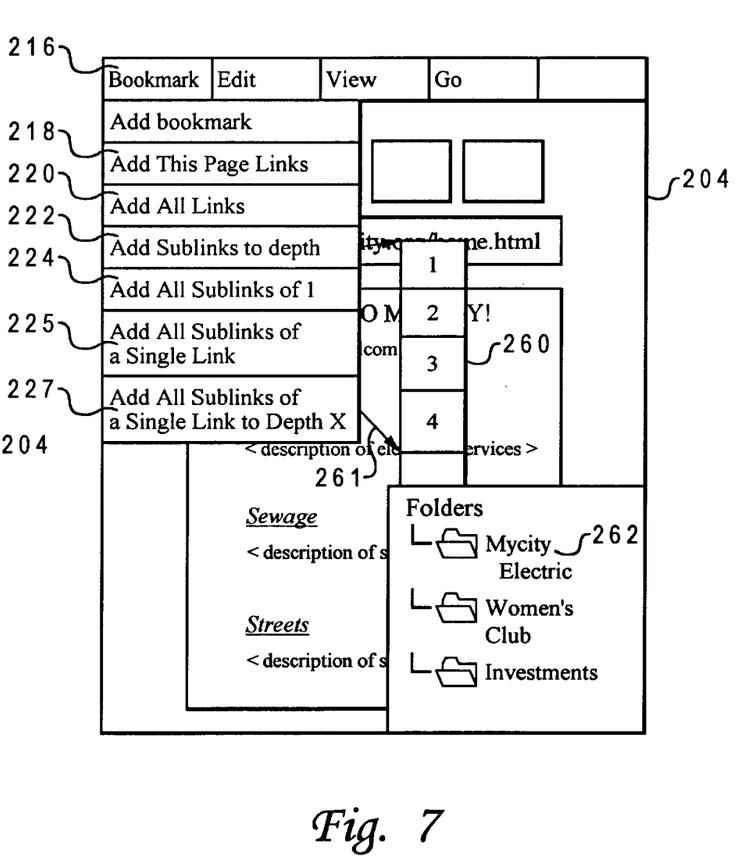
FIG. 7 illustrates a pull down menu for adding network addresses for linked web pages in accordance with the present invention.

Referring now to FIG. 7, a browser is depicted which has selectable features for adding linked web pages to a bookmark list. Selection of bookmark menu heading 216 displays features associated with the process of bookmarking. Additionally, selection of bookmark menu heading 216 displays presently existing folders in accordance with the present invention. A user may select bookmark menu heading 216 by pointing and clicking on bookmark menu heading utilizing a pointing device such as pointing device 261.

FIG. 7 illustrates how links and sub-links such as electric link 208 of FIG. 5 can be placed into a folder such as a folder entitled "my city" 262. All links from a displayed web page or from an initial web page can be placed into a folder and therefore all links are cataloged or classified under a single heading or folder in response to a single user input.

Many different embodiments for adding links may be desired by a user.

The selectable sub menu headings under bookmark menu heading 216 include add this page links 218, add all links 220, add sub-links to depth 222, and add all sub-links of 1 224. Further, add sub-links to depth 222 prompts the display of search depth pull down menu 260 to select the depth of sub-links to be added. In the example of FIG. 5, if a user desires to add electric link 208, sewer link 210 and streets link 212 or all links displayed on initial web page 204, sub menu add this page links 218 would be selected. Selecting add this page links 218 would allow fast and efficient classification of related subject matter into a common folder with the folder my city 262.

Selection of a link such as electric link 208 of FIG. 5 will automatically retrieve and display the html page associated with the displayed link. Often, the web page retrieved by selection of a link such as electric link 208 of FIG. 5 will contain additional links to other related subject matter which are referred to as sub-links. While links provided on initial web page 204 are referred to as links, links provided on page linked by initial web page 204 are commonly referred to as sub-links.

Selection of add all links 220 would retrieve and classify all links and sub-links within a common folder within the browser. It would be preferred to limit the quantity of network addresses which could be placed into a folder because the selection of add all links 220 could retrieve an infinite quantity of links and sub-links.

Figure 8:
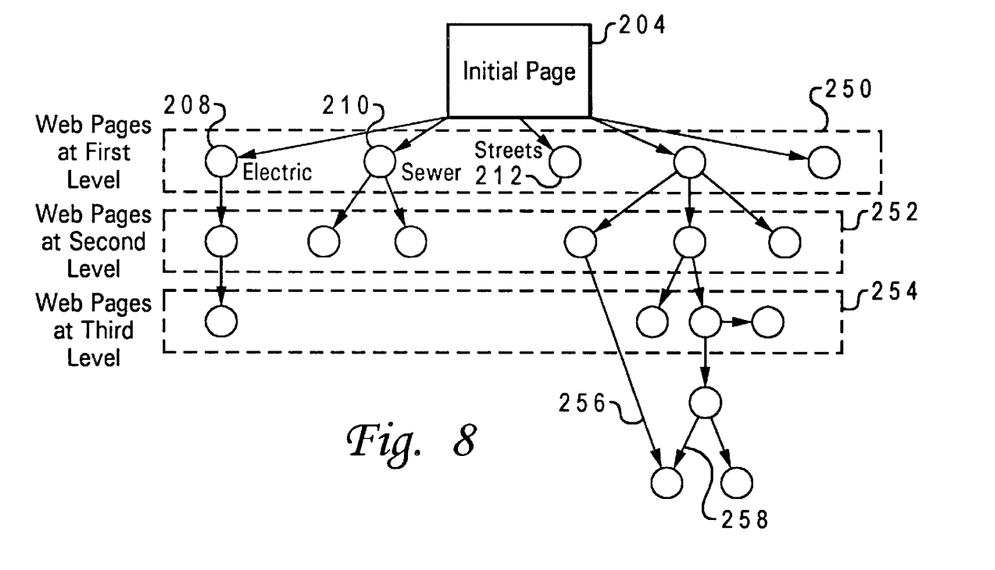
FIG. 8 depicts an initial web page having links and sub-links to other web pages in accordance with the present invention.
Figure 9:
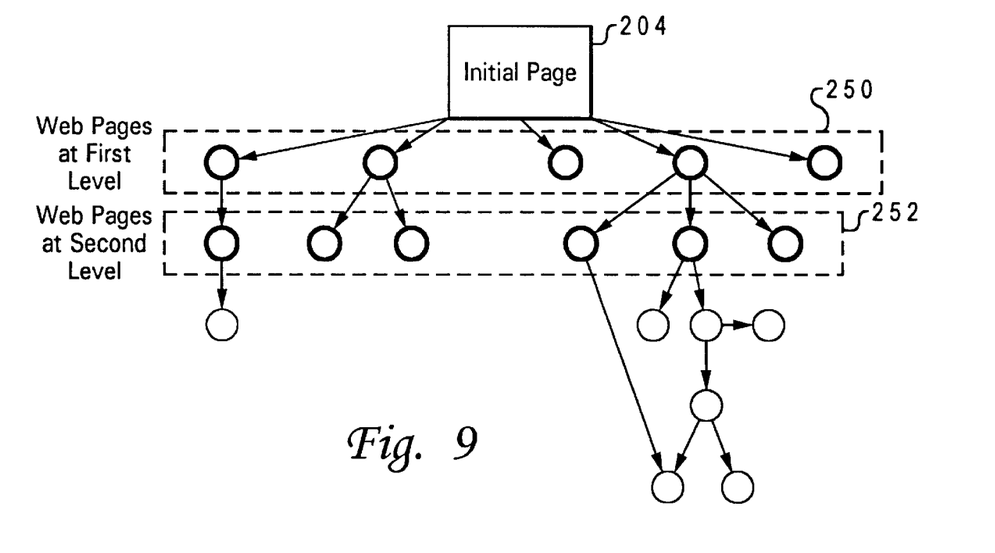
FIG. 9 is a pictorial illustration of an initial web page having links and sub-links to other web pages and the linked web page which are classified in a folder for a user selection of add lengths of 1 in accordance with the present invention.

Referring to FIGS. 8, 9, 10 and 11 an illustrative hierarchy of web pages is shown. In FIGS. 8 and 9 initial web page 204 and four "first generation" linked web pages are depicted within third dashed enclosure 250. In FIGS. 5 and 8 like parts are identified-by like reference numerals. Included in first generation links are electric link 208, sewer link 210 and streets link 212. "Second generation" links or sub-links are illustrated in fourth dashed enclosure 252. In the example provided, second generation links or sub-links would be links provided on the web pages of electric link 208 and sewer link 210. Third generation links are illustrated in fifth dashed enclosure 254. In response to a user selection a scope of links can be classified and catalogued in a folder.

The circles represent web pages and the lines and arrows interconnecting initial web page 204 with linked web pages represent address which provide address information to retrieve the linked pages. In FIGS. 8–11, the darkened circles indicate the web pages which would be retrieved and classified in response to particular menu selections under bookmark menu heading 216. Each menu selection provides a different scope of links to be classified.

First link 256 and second link 258, link an identical page via separate links. However, it is preferred that only a single entry of a linked network address would be stored in a folder. Duplicate links provide a useful parameter. A search for links could be terminated by the method of the present invention when a predetermined number of duplicate links such as first link 256 and second link 258 are encountered. Duplicate links can be utilized to measure the completeness of a search.

Referring back to FIG. 7, selection of add sub-links to depth 222 would restrict the depth of the link search, retrieval and classification of network addresses to a specific lineage and avoid the potential problems associated with selection of add all links 220. The search and classification could be limited to a second or third generation retrieval. Search depth pull down menu 260 allows a graphical user interface to accept a search depth command with the efficiency and user friendliness of a graphical user interface.

Selection of add all sub-links of 1 224 in FIG. 7 is represented pictorially in the illustration of FIG. 9. Selection of add all sub-links of 1 224 allows a user to search and classify all links into my city folder 262 which result from second generation links of initial web page 204.

Figure 10:
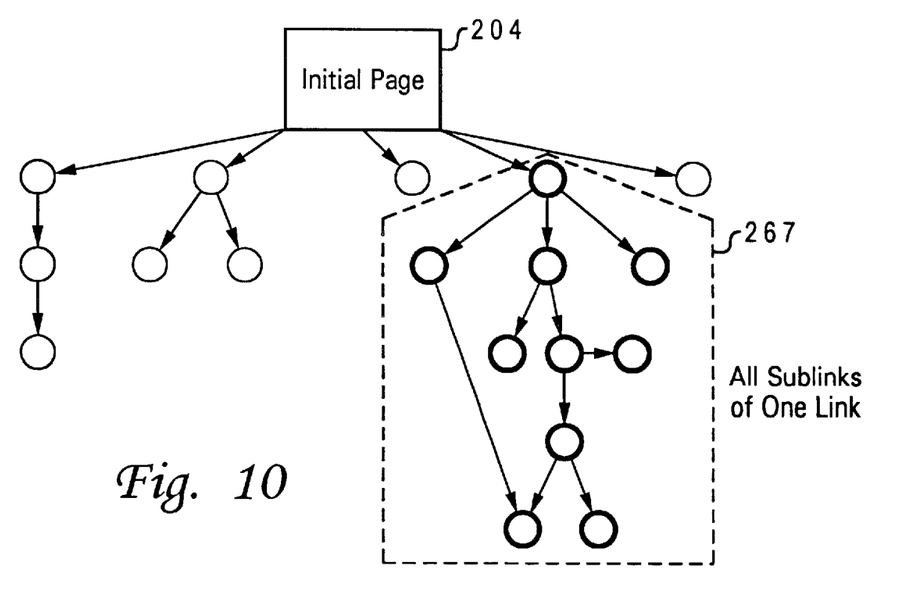
FIG. 10 is a pictorial illustration depicting an initial web page having links and sub-links to other web pages and the web pages which are classified in a folder in response to a user selection of add sub-links from a single link in accordance with the present invention.

Referring back to FIG. 7, pull down menu selection add all sub-links of a single link 225 is depicted. Referring to FIG. 10, a pictorial representation of the network addresses which would be retrieved in response to the selection of add all sub-links of a single link 225 is depicted in sixth dashed enclosure 267.

Figure 11:
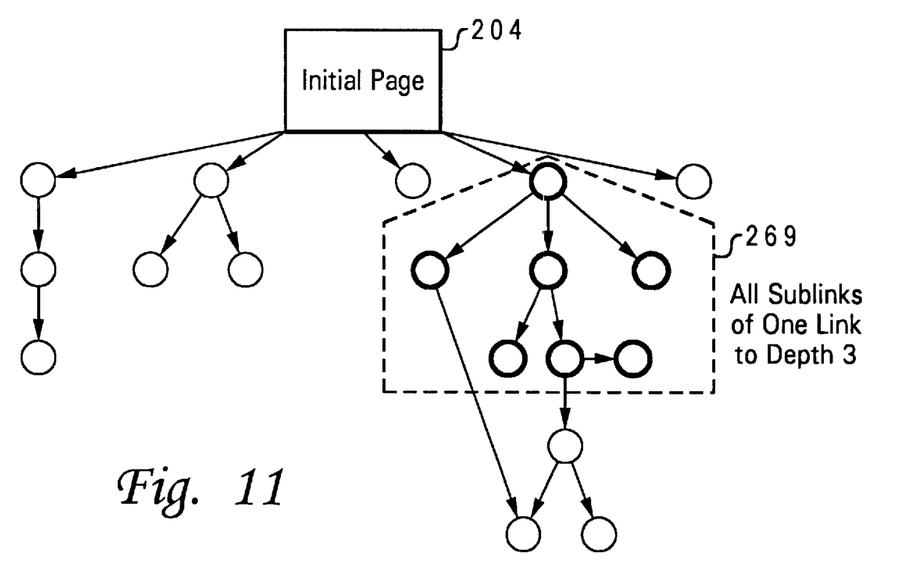
FIG. 11 is a pictorial illustration depicting an initial web page having links and sub-links to other web pages and the network addresses which are classified in a folder in response to a user selection of add lengths from a single link at a depth of 3 in accordance with the present invention.

Referring back to FIG. 7 a pull down menu selection add all sub-links of a single link to depth X 227 is depicted. FIG. 11 is a pictorial representation of the network addresses which would be retrieved in response to the selection of add all sub-links of a single link to depth X 227 where X is selected to be 3 is depicted in seventh dashed enclosure 269. Many embodiments for placing links in common folders in response to a single user input could be preformed without parting from the scope of the present invention.

Figure 12:
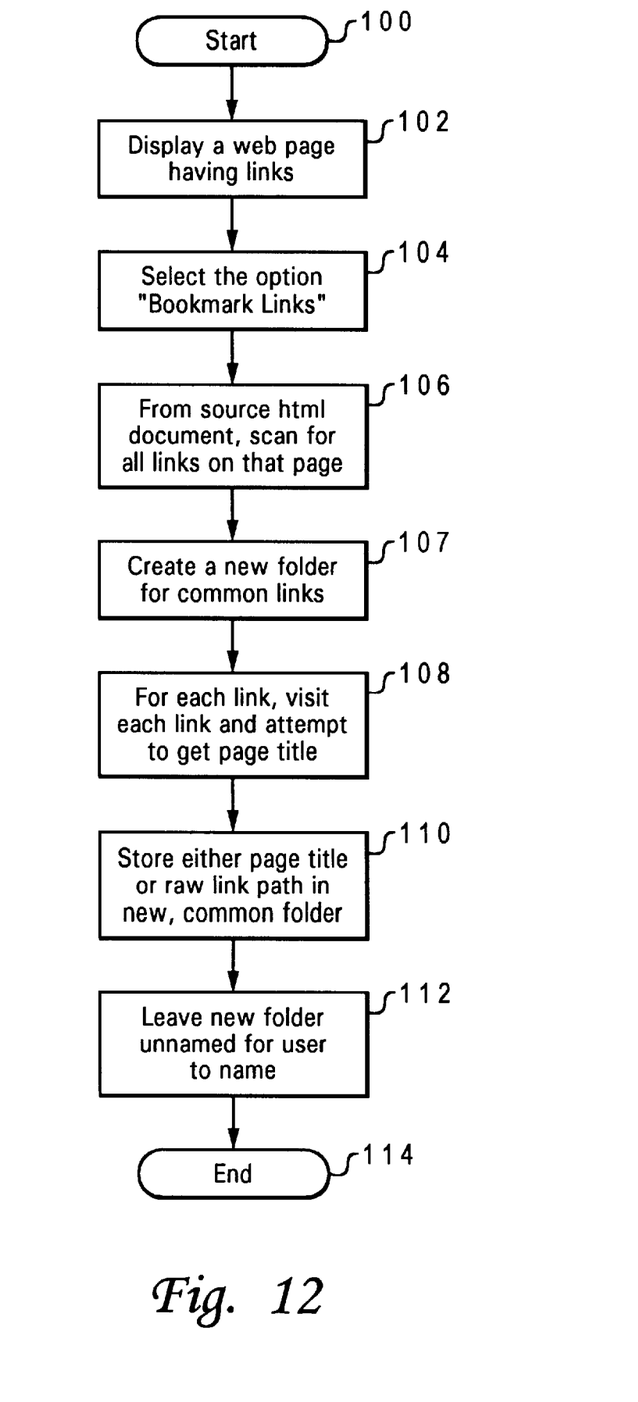
FIG. 12 illustrates a high level flow diagram of a in accordance with a preferred embodiment of the present invention is illustrated.

As illustrated in FIG. 12 a high level flow diagram in accordance with a preferred embodiment of the present invention is illustrated. The method starts at block 100 and proceeds to block 102. As illustrated in block 102 the method displays a user selected web page or an initial page which provides links to other web pages. Next, as depicted in block 104 a user selects an option on a toolbar or in a pull down menu to bookmark a plurality of links which are available from the displayed web page. The selection to place multiple links into a common folder places the linked network addresses from the displayed web page into a common folder within a bookmark feature. Next, as illustrated in block 106 the method scans the displayed home page for all provided links or URL addresses and retrieves the network addresses of the linked pages. When sub-link network addresses are requested by the user, the first, second and third generation web pages according to the depth of the search would be accessed to determine their network address.

After the links within the displayed web page have been identified, a new folder for the common links is created, as shown at block 107. The new folder is created within the bookmark pull down menu. The new folder may be named according to the title of the initial page or the data processing system may request the user to title the new folder, as described below.

Next, as depicted in block 108 each URL address is accessed and the title of the linked network location is retrieved. In FIG. 12 each linked network location is visited and the title of the visited network location is recorded for bookmark utilization. If a linked page does not have a title, the method of the present invention could label the page untitled.

Next, as illustrated in block 110 the method creates and stores either the title of the web page or the URL address in a common folder. Next, as depicted in block 112 the folder can be named utilizing verbiage which describes the common subject matter of the original home page and all links or sub-links. The process then ends at block 114.

The present invention can collect all links or sub-links which can be accessed from a home page through links and place the network location in a folder within bookmark pull down menu in response to a single user input.

While the invention has been particularly shown and described with reference to a preferred embodiment, it will be understood by those skilled in the art that various changes in form and detail may be made therein without departing from the spirit and scope of the invention.

What is claimed is:

1. An improved method for efficiently recording network addresses referenced by displayed data, said method comprising the steps of:

in response to a first user input, utilizing a data processing system to retrieve, from a first network address, data having a plurality of links to related network addresses;

displaying said retrieved data within said data processing system;

receiving a second user input specifying a scope of network addresses to be recorded while said data processing system is displaying said data from said first network address, said scope of network addresses specifying a selected link and sub-links thereof to a predetermined depth; and in response to said second user input, automatically recording each network address within said scope which is associated with said plurality of links in a common category, such that a user can later efficiently retrieve content from said related network addresses by utilizing said common category.

2. The method of claim 1 wherein:

said plurality of links in said retrieved data comprise two or more direct links and two or more sub-links; and said step of receiving said second user input comprises receiving input that limits said scope to said two or more direct links and to said two or more sub-links.

3. The method of claim 1, further including the step of titling said common category.

4. A data processing system that efficiently records network addresses referenced by displayed data, said data processing system comprising:

means responsive to a first user input for retrieving, from a first network address, data having a plurality of links to related network addresses;

means for displaying said retrieved data with said data processing system;

means for receiving a second user input specifying a scope of network addresses to be recorded while said data processing system is displaying said data from said first network address, said scope of network addresses specifying a selected link and sub-links thereof to a predetermined depth; and means responsive to said second user input for automatically recording each network address within said scope which is associated with said plurality of links to a common category, such that a user can later efficiently retrieve content form said related network addresses by utilizing said common category.

5. The data processing system in claim 4, wherein:

said plurality of links in said retrieved data comprise two or more direct links and two or more sub-links; and said means for selecting a scope of network addresses to be recorded comprises means for selecting said two or more direct links and said two or more sub-links.

6. The system of claim 4, further comprising means for titling said common category.

7. A program product for efficiently recording network addresses referenced by displayed data, said program product comprising:

means responsive to a first user input for retrieving, from a first network address, data having a plurality of links to related network addresses;

means for displaying said retrieved data within said data processing system;

means for receiving a second user input specifying a scope of network addresses to be recorded while said data processing system is displaying said data from said first network address, said scope of network addresses specifying a selected link and sub-links thereof to a predetermined depth; and means responsive to said second user input for automatically recording each network address within said scope which is associated with said plurality of links to a common category, such that a user can later efficiently retrieve content from said related network addresses by utilizing said common category; and a computer usable medium encoding said means for retrieving, said means for displaying, said means for receiving, and said means for automatically recording.

8. The system of claim 7, wherein:

said plurality of link in said retrieved data comprise two or more direct links and two or more sub-links; and said means for selecting a scope of network addresses to be recorded comprises means for selecting said two or more direct links and said two or more sub-links.

9. The program product of claim 1 wherein said computer usable medium also encodes means for titling said common category.

* * * * *

UNITED STATES PATENT AND TRADEMARK OFFICE
CERTIFICATE OF CORRECTION

PATENT NO.   : 6,334,145 B1
DATED        : December 25, 2001
INVENTOR(S)  : Adams et al.

It is certified that error appears in the above-identified patent and that said Letters Patent is hereby corrected as shown below:

Column 5,
Line 35, please add -- " -- before the word "add";
Line 35, please add -- " -- after the word "bookmark";

Column 7,
Line 63, please delete "IRS/6000" and replace with -- RS/6000 --

Signed and Sealed this

Twenty-third Day of April, 2002

Attest:

JAMES E. ROGAN
*Attesting Officer*   *Director of the United States Patent and Trademark Office*